United States Patent [19]

Adrian

[11] Patent Number: 4,866,639
[45] Date of Patent: Sep. 12, 1989

[54] METHOD AND APPARATUS FOR DETERMINING THE DIRECTION OF MOTION IN MULTIPLE EXPOSURE VELOCIMETRY

[75] Inventor: Ronald J. Adrian, Champaign, Ill.

[73] Assignee: University of Illinois, Champaign, Ill.

[21] Appl. No.: 23,773

[22] Filed: Mar. 9, 1987

[51] Int. Cl.[4] .......................... G01P 5/22; G01P 3/36; G01F 1/00

[52] U.S. Cl. .................................... 364/525; 364/561; 73/861.06; 356/28

[58] Field of Search ............... 364/560, 561, 565, 550, 364/551, 554, 555, 442, 525; 340/703, 720, 729, 794, 795, 755; 358/88, 89; 382/47, 48; 73/861.05, 861.06; 356/28, 27

[56] References Cited

U.S. PATENT DOCUMENTS

| | | | |
|---|---|---|---|
| 3,714,538 | 1/1973 | Albrecht et al. | 364/565 |
| 3,804,517 | 4/1974 | Meyr et al. | 364/565 X |
| 3,982,101 | 9/1976 | Kalb et al. | 364/565 |
| 4,176,950 | 12/1979 | Franke | 356/28 |
| 4,201,497 | 4/1980 | Hartmann et al. | 356/28 |
| 4,340,888 | 7/1982 | Seroskie | 340/755 |
| 4,470,696 | 9/1984 | Ballard | 356/28 X |
| 4,509,131 | 4/1985 | Krasnjanski | 364/565 |
| 4,517,845 | 5/1985 | Ransheim et al. | 73/861.05 |
| 4,537,503 | 8/1985 | Liu | 356/28 X |
| 4,543,834 | 10/1985 | Hasegawa et al. | 73/861.05 |

OTHER PUBLICATIONS

Matthes, W., W. Riebold and E. De Cooman, "Measurement of the Velocity of Gas Bubbles in Water by a Correlation Method", *The Review of Scientific Instruments*, vol. 41, No. 6, Jun. 1973, pp. 843–845.

Primary Examiner—Parshotam S. Lall
Assistant Examiner—Joseph L. Dixon
Attorney, Agent, or Firm—John F. Ohlandt

[57] ABSTRACT

The present invention is in the context of the measurement of velocity fields of fluid flows containing many small scattering sites, which exist either in the form of particles or optically activated, discrete fluid volumes. The invention is directed to a method and apparatus for resolving ambiguity with respect to the direction of displacement of particle images recorded by multiple exposures on film or videographic media. The invention enables the elimination of directional ambiguity by means of shifting the image field between exposures by an amount that is greater than any negative displacement occurring in the image field. In this way, all recorded displacements are positive, and negative displacements are obtained from the measurements by mathematically subtracting the artificial shift after the measurements.

8 Claims, 5 Drawing Sheets

PHOTOGRAPHIC
FIELD OF VIEW

METHOD AND APPARATUS FOR DETERMINING THE DIRECTION OF MOTION IN MULTIPLE EXPOSURE VELOCIMETRY

The United States government has rights in this invention as a result of funding by the National Science Foundation on the Contract NSF-ATM 82-03521.

BACKGROUND OF THE INVENTION

The present invention pertains to the measurement of the velocity of fluid flows and was developed originally for use in a device which measures the velocity of fluid flow by photographing the displacements of fine (micron sized) particles using multiple exposures from a pulsed laser. The primary background area is, therefore, instrumentation for fluid flow measurement. More generally, the invention pertains to any image processing problem in which the displacements of many discrete images are to be measured, including the motion of solids.

For specific background material, reference may be made to co-pending application Ser. No. 738,775 now U.S. Pat. No. 4,729,109 assigned to the assignee of the present invention. The disclose of that application is incorporated herein by reference. In that application a method and apparatus for measuring the displacements of particle images for multiple exposure velocimetry are described. In particular, the method and apparatus involves the provision of a source of compact images and a specialized operation of compressing those images, which entails integrating the image intensity in the X and Y directions to produce respective electrical signals corresponding to the images. The system further involves analyzing the electrical signals resulting from the separate one dimensional compressions so as to determine the X and Y image displacements respectively.

The complete description of the system of the forenoted co-pending application is incorporated herein by reference as one example of a system which can be improved by inclusion of the present invention. However, the present invention is not limited to being incorporated only into the system of that co-pending application, but is of general applicability to velocimetry systems.

DESCRIPTION OF PRIOR KNOWLEDGE

In pulsed laser velocimetry (also called particle image velocimetry or PIV, and laser speckle velocimetry or LSV), multiple images displaced by the motion of a fluid are recorded photographically, videographically, or holographially. The images are created by accurately timed pulses of light from a laser or an incoherent source, and the fluid velocity is inferred from the displacement of the image field between exposures. An appreciation of already developed techniques can be gained by reference to the following: R. J. Adrian and C. S. Yao, "Pulsed Laser Velocimetry for Measurement of Fluid Flow," in Proceedings, Eighth Biennial Symposium on Turbulence, G. Patterson and J. L. Zakin, Eds. (Univerity of Missouri, Rolla, 1983); R. J. Adrian, "Pulsed Laser Technique Application to Liquid and Gaseous Flows and the Scattering Power of Seed Materials," Appl. Opt. 24, 44 (1985); R. J. Adrian, "Scattering particle Characteristics and Their Eifect on Pulsed Laser Measurements of Fluid flow: Speckle Velocimetry vs Particle lmage Velocimetry," Appl. Opt. 23, 1690 (1984).

Referring now to FIGS. 1A, 1B and 1C of the drawing, there will be seen image fields of a type that have become well known in this art. If the concentration of Particles is sufficiently high, the image field consists of speckles as in FIG. 1C. On the other hand, if the concentration is lower, the image field consists of images of individual particles, as in FIGS. 1A and 1B. It will of course be understood by those skilled in the art that the particles noted may be replaced by small discrete volumes of fluid that have been optically activated by flourescences or phosphorescence.

In the typical situation, the recorded image covers a large region in the fluid, for example 100 mm×100 mm, and the particle displacements in many small interrogation spots of the order of 1 mm in diameter are desired. These interrogation spots may contain many particle images. In such cases one must then use statistical techniques such as two-dimensional spatial autocorrelation which is described for example in the first reference noted above by Adrian and Yao. Alternately, the Young's fringe method may be employed, as described for example in R. Erbeck, "Fast lmage Processing with a Minicomputer Applied to Speckle Photography," Appl. Opt. 24, 3838 (1985), so as to determine which images constitute pairs of images from the same particle. A serious problem that is presented in velocimetry systems is that measurements of velocity inferred from the displacements of images are ambiguous to the extent that the direction of the displacement is undetermined to within +180. A variety of techniques for determining the direction are already known; however, as will be made clear, these various techniques have not been entirely satisfactory.

For example, in the case of double-exposures where pairs of particle images can be clearly discerned, the direction of motion can be determined by marking the first and second exposures differently, Various known techniques or methods for eliminating directional ambiguity are shown in FIG. 2. Images may be marked by using unequal intensities as in FIG. 2A; using different colors as in FIG. 2B; using a multiple pulse sequence with coded spacing, as in FIG. 2C; or using flourescent or phosphorescent particles whose images leave decaying streaks on the photograph after the exposure, as in FIG. 2D. The latter two schemes are described respectively in the following references: K. A. Marko and L. Rimai, "Video Recording and Quantitative Analysis of Seed Particle Track Images in Unsteady Flow," Appl. Opt. 24, 3666 (1985); and M. Gharib, M. A. Hernan, A. H. Yavrouian an V. Sarohia, "Flow Velocity Measurement by lmage Processing of Optically Activated Tracers," AIAA Paper No. 85-0172 (1985).

It will be appreciated that the above noted methods work for low image density PIV, but aside from the two-color scheme of FIG. 2B, they are not generally useful for high image density PIV or LSV. This is because statistical analysis by autocorrelation always yields a function that is symmetric in its argument, independent of asymmetry in the original pulse-pairs. This difficulty also exists for the Young's fringe method, since Young's fringes are related to the spatial correlation by a Fourier transformation. The asymmetry can be preserved by cross-correlating images on separate recording frames, as in cinematography. A single frame containing two-color exposures can be separated into two image fields by color filters and the fields can be interrogated by cross-correlation.

SUMMARY OF THE INVENTION

The present invention resides in a technique and system for determining unambiguously the direction of displacement, and hence velocity, in double-pulsed—or generally speaking, multiple-pulsed, laser velocimetry systems. The novel method or technique works for high or low image density PIV and for LSV. It can be used in conjunction with single-frame analysis by autocorrelation or by the Young's fringe method, or with any statistical or direct method of measuring displacement.

In accordance with the method and apparatus of the invention, the successive images of each scattering site or speckle are shifted with respect to the first image so that all image displacements are positive, even though physical displacements of the scatterers may be negative. This unique result is accomplished by shifting the image field during the photographic process between the first exposure and each subsequent exposure. Consequently, all second images are displaced in the image plane by a constant amount $X_s$, and subsequent images are shifted by amounts proportional to the time lapse since the first image exposure. In providing a detailed description of a preferred embodiment which follows, explanation will be in terms of double exposures. However the extension to multiple exposures greater than two is self-evident.

Briefly stated, the primary feature of the present invention is in a context or environment involving a velocimetry system for measuring fluid velocity, such system comprising a light source; means for recording multiple particle images displaced by the motion of the fluid, said images being created by accurately timed pulses of light from the light source such that the fluid velocity is inferred from the displacement of the image field between exposures. Uniquely provided are means for determining unambiguously the direction of displacement of such images, the means including an arrangement for shifting successive images so that all image displacements are positive, the means for shifting being operative during the photographic process between the first exposure and subsequent exposures.

Other and further objects, advantages and features of the present invention will be understood by reference to the following specification in conjunction with the annexed drawing, wherein like parts have been given like numbers.

BRIEF DESCRIPTION OF DRAWING

FIG. 1 illustrates a variety of photographic recording modes in public pulsed laser velocimetry.

FIG. 2 depicts a variety of techniques previously used in to determine the direction of displacement between exposures on a single frame, thereby to resolve any ambiguity with respect to direction.

FIG. 3 illustrates the principle of the image shifting technique in accordance with the invention; in particular.

DESCRIPTION OF THE PREFERRED EMBODIMENT

Figure 1A:
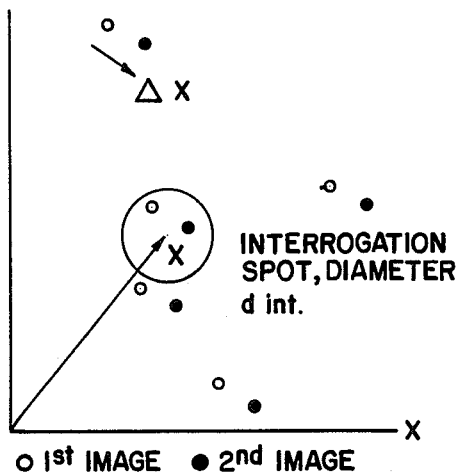
FIG. 1A is a case where the concentration of scattering particles is low, so that the probability of seeing more than one pair of images in the interrogation spot is small.
Figure 1B:
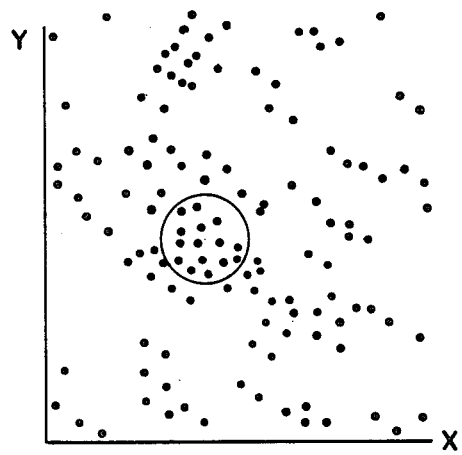
FIG. 1B shows a higher concentration of particles.
Figure 1C:
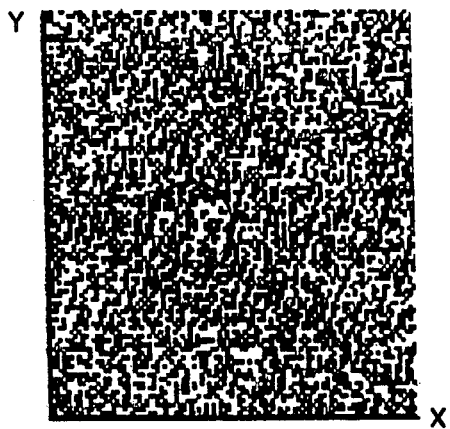
FIG. 1C is a case where particle concentration is so great that the images of the particles overlap, creating a random speckle pattern.
Figure 2A:
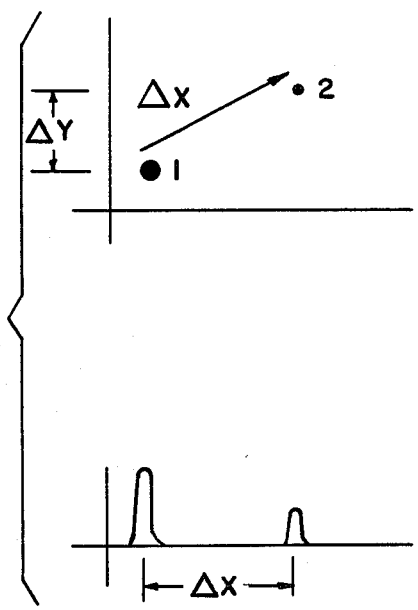
In FIG. 2A, the first image is distinguished from the second image by illuminating it with brighter light.
Figure 2B:
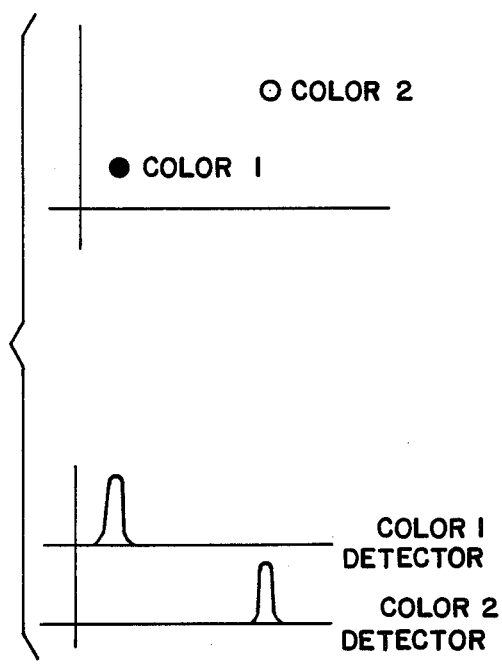
In FIG. 2B, the images are distinguished by illuminating them with two different colors.
Figure 2C:
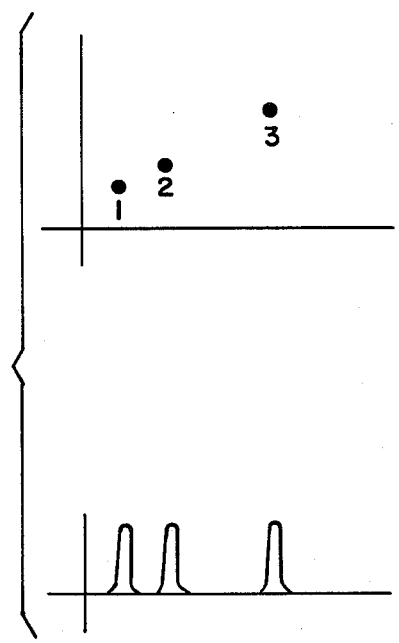
In FIG. 2C, the last image is identified by inserting additional images in a coded pattern.
Figure 2D:
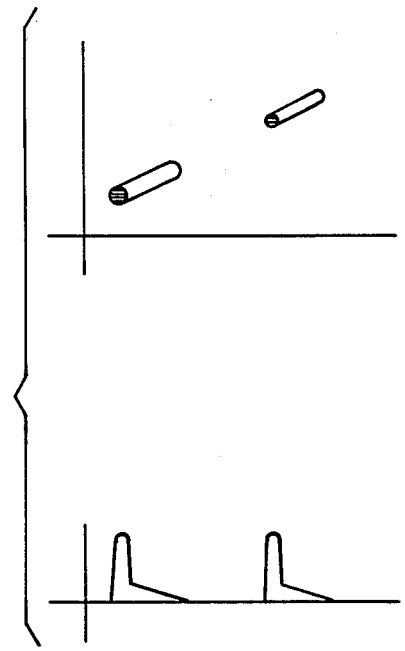
In FIG. 2D, fluorescent particles are used, so that their photographic images have fluorescent tails which identify the direction of particle motion.

Referring now to the Figures of the drawing, it will be recalled that reference has already been made to FIGS. 1 and 2 in connection with the description of the prior knowledge available in the context of the present invention.

Referring now to FIG. 3, the principle of the image shifting technique of the present invention will be appreciated. It will be particularly understood that without image displacement the scatterer at $x(t)$ and $x(t+\Delta t) = x(t) + \Delta x$ produces erected images at $X(t) = Mx(t)$ and $X(t+\Delta t) = X(t) + M\Delta x$, where M is the magnification. The displacement in the image plane is $$X = X(t + t) - X(t) \qquad (1a)$$
$$= M\Delta x \qquad (1b)$$
$$= Mu\Delta t \qquad (1c)$$

where $u(x,t)$ is the fluid velocity, and (1c) becomes an equality for sufficiently small values of $\Delta t$. The displacement may be positive or negative, depending upon the velocity $u(x,t)$. With image shifting, the image field is shifted by $X_s$ in the image plane between first and second exposures so that displacement of the second exposure becomes $\Delta Xt = Xs + M\Delta x$. The magnitude of $X_s$ is chosen so that components of $\Delta X_T = X_s + Mu\Delta t$ are always positive, i.e. second images always lie to the right and above the first images.

The selection of $X_s$ requires a knowledge of the maximum negative velocity components in the x- and y-directions, just as the magnitude of the frequency shift in laser Doppler velocimetry is selected from the knowledge of a maximum negative velocity.

Figure 3A:
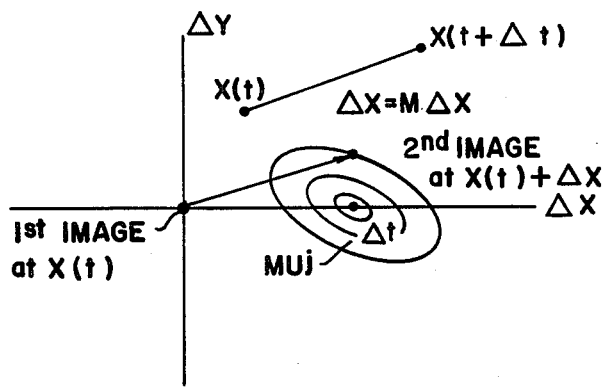
FIG. 3A depicts probable displacements observed at one point in the field of view.
Figure 3B:
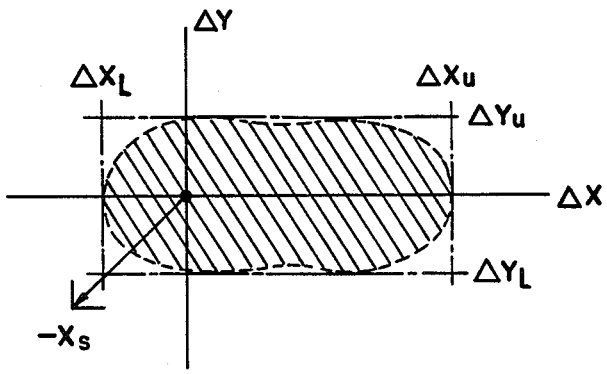
FIG. 3B the domain of probable displacements for all points in the field of view, wherein all second images lie within the cross-hatched region.
Figure 3C:
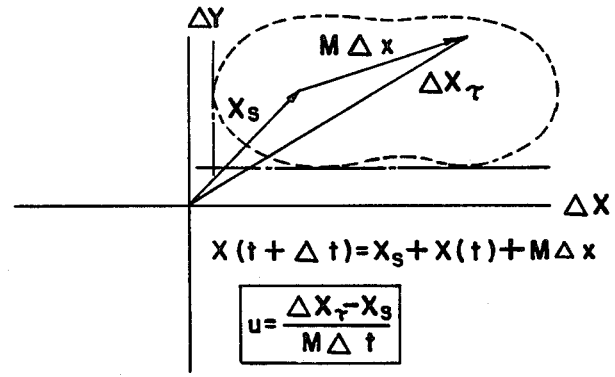
FIG. 3C depicts the domain of probable displacements after shifting all second images by $X_s$.
Figure 4A:
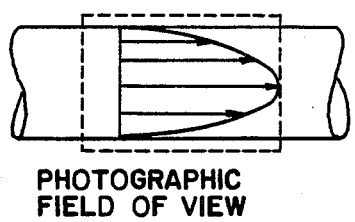
FIGS. 4A and 4A' involving unidirectional laminar flow FIGS. 4B and 4B' low intensity grid turbulence, and FIGS. 4C and 4C' high intensity turbulent flow with recirculation.
Figure 4A:
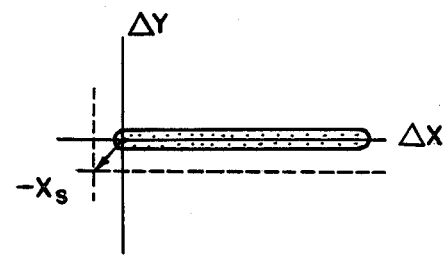
Figure 4B:
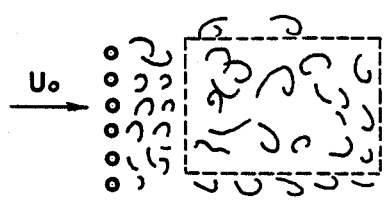
FIG. 4 illustrates a selection of the, shift displacement for various fluid flows.
Figure 4B:
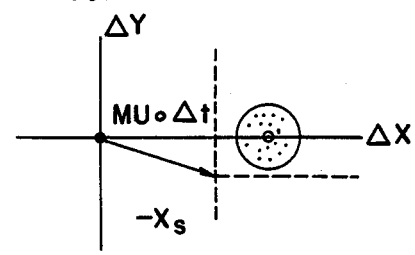
Figure 4C:
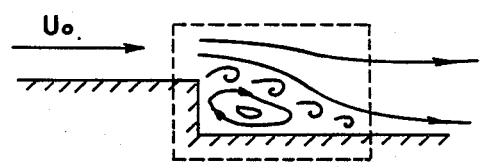
Figure 4C:
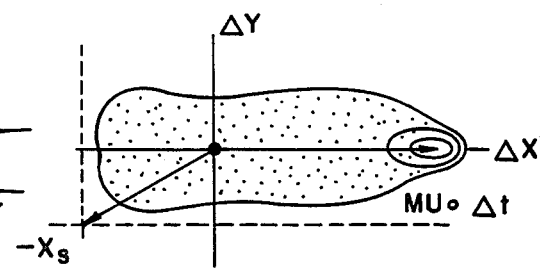

FIG. 3A shows a domain of probable fluid displacements from a point x in the field. The domain is defined by the probability density function for the displacement, which can be related to the probability density function for Eulerian velocity when the displacement is small (as it must be for accuracy in the PLV technique). The area inside the largest contour in FIG. 3(A) is the region that contains almost all displacements with high probability. FIG. 3B shows the domain of all probable displacements obtained by examining many different points in the field of view of the fluid, each point possessing a different probability density function for velocity. For illustrative purposes FIG. 3B was calculated for the axial-radial plane a few diameters downstream from the exit plane of an axisymmetric jet of velocity Uj, assuming joint normal probability densities for the turbulent lluctuations. The cross-hatched region is the union of the probability domains from all points in the photographic field of view. All displacements fall in this region with high probability. The upper and lower bounds of the domain of probable displacements are identified by $X_L$, $X_U$ and $Y_L$, $Y_U$. The components of the shift vector $X_s$ are chosen to exceed the greatest lower bounds. Then, as shown in FIG. 3C, addition of the vector $\Delta X_T$ whose components are always positive. Measurements of these components using an image compression technique, a spatial correlation technique or the Young's fringe method would each yield positive numbers, and subtraction of the shift from these measurements would yield negative velocities. The formula for velocity is simply $$u = \frac{X_T - X_s}{M\Delta t}$$

The selection of $X_s$ for various types of flow is illustrated in FIG. 4. The time between first and second exposure is adjusted for a given flow to produce maximum displacements of particles by the flow field of order 0.1 to 10 mm, with 1 mm being a typical value. The value of $X_s$ will be of the same order as this maximum displacement, depending upon the specific velocity field as illustrated in FIG. 4. Thus, a typical value of $X_s$ is 0.5 mm.

Figure 5:
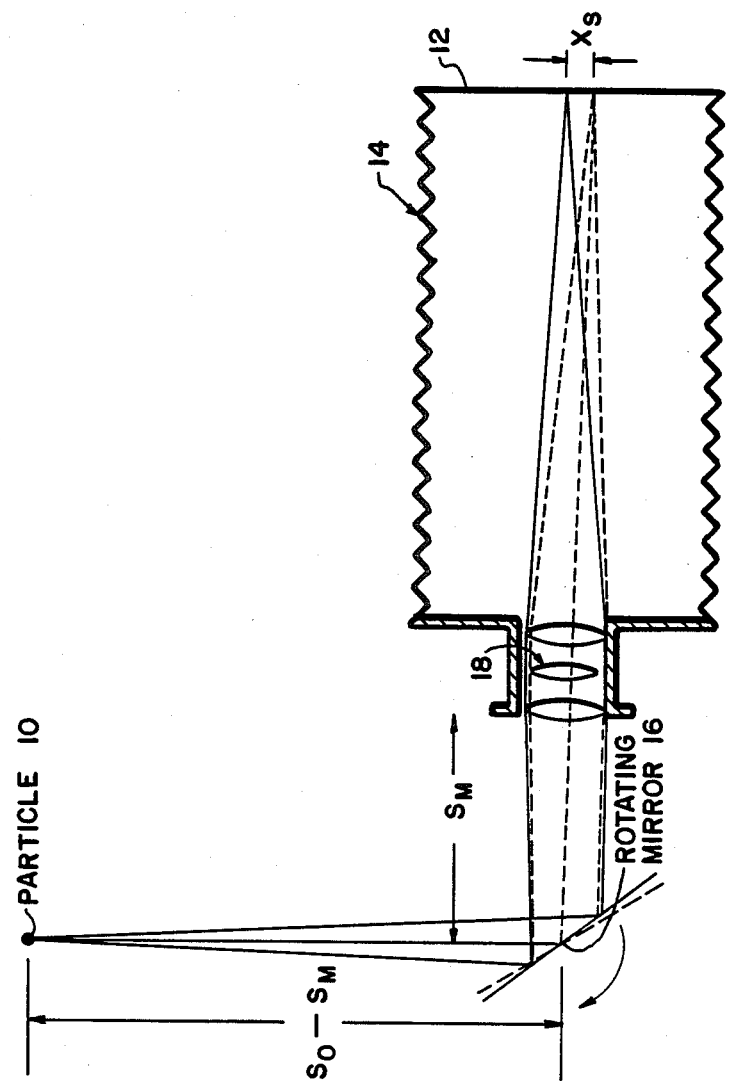
FIG. 5 illustrates in a preferred embodiment the implementation of image shifting by means of a rotating mirror.

The implementation of the primary feature of the present invention, that is the feature of eliminating directional ambiguity by means of shifting the image field between exposures by an amount that is greater than any negative displace occurring in the image field may be appreciated by reference to FIG. 5. In accordance with this diagrammatic showing, a basic photographic process is employed, that is to say a photograph is obtained of what in this case is shown as a simple particle 10 in an image plane, such image of the particle being captured on a film or other medium 12 disposed in the camera 14.

It will be especially noted that the photograph is taken through a rotating mirror 16 so that the image field is displaced by a fixed amount during the time between exposures. The image displacement is $|X_s| = 2M \omega_m(s_o - s_m)\Delta t$, where $\omega_m$ is the mirror rotation rate, $s_o$ is the image distance, and $s_m$ is the distance from the camera lens 18 to the mirror 16.

It will be appreciated that the basic photographic process described above is carried out prior to the normal operation of a known velocimetry system such as the one described in co-pending application Ser. No. 738,775 now U.S. Pat. No. 4,729,109. Thus, the photographic or film image record already created by the technique of the invention is the record that will be interrogated or read out by a velocimetry system.

What has been disclosed is a method and apparatus for resolving ambiguity with respect to the direction of displacement of particle images recorded by multiple exposures on film or videographic media. The invention enables the elimination of such directional ambiguity by means of shifting the image field between exposures by an amount that is greater than any negative displacement occurring in the image field. Accordingly, the involved image shifting enables determining the direction of displacement, and hence velocity, for all types of pulsed laser velocimeters and, more generally, for any type of multiple exposure displacement measuring device. The image shifting technique of the invention is independent of the scattering properties of the particles, and/or the intensity of the illumination of the first image with respect to the second image; moreover, it does not require multiple frame exposures or multiple or multiple colors. It can be used in conjunction with direct particle displacement interrogation of discernible double exposure pairs and with compressed image systems. Its greatest utility is that it works for all types of statistical image analysis as well. These include Young's fringe analysis, spatial correlation analysis or histogram analysis.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. In a velocimetry system in which photographic images, involving first and subsequent exposures, are created by accurately times pulses of light from a light source, and multiple particle images displaced by the motion of a fluid are recorded, such that the fluid velocity is inferred from the displacement of the image field between exposure, the improvement which comprises:

means for determining unambiguously the direction of displacement, and hence velocity in said system, said means including means for shifting successive particle images of each scattering site with respect to the first image so that all image displacements are positive even through physical displacements of the scatterers may be negative, said means for shifting being operative during the photographic process between the first exposure and subsequent exposures.

2. A system as defined in claim 1, in which said means for image shifting comprises a rotating mirror.

3. A system as defined in claim 2, in which second images are displaced in the image plane by a constant amount $X_s$ and subsequent images are shifted by amounts proportional to the time lapse since the first image exposure.

4. In a velocimetry method in which images are created by accurately timed pulses of light from a light source, and multiple particle images displaced by the motion of a fluid are recorded, such that the fluid velocity is inferred from the displacement of the image field between exposures, the improvement which comprises:

the step of determining unambiguously the direction of displacement, and hence velocity, in such system, said step including shifting successive images of each scattering site with respect to the first image so that all image displacements are positive even though physical displacements of the scatterers may be negative.

5. A method as defined in claim 4 in which said step is carried out during the photographic process between the first exposure and subsequent exposures.

6. A method as defined in claim 5, in which second images are displaced in the image plane by a constant amount of $X_s$, and subsequent images are shifted by amounts proportional to the time lapse since the first image exposure.

7. A velocimetry system for measuring fluid velocity, such system comprising:
   a light source;
   means for recording multiple particle images displaced by the motion of the fluid, said images being created by accurately timed pulses of light from said light source, such that fluid velocity is inferred from the displacement of the image field between exposures, and
   means for determining unambiguously the direction of displacement, said means including means for shifting successive images so that all image displacements are positive, said means for shifting being operative during the photographic process between the first exposure and subsequent exposures.

8. A system as defined in claim 7 in which all second images are displaced in the image plane by a constant amount Xs and subsequent images are shifted by amounts proportional to the time lapse since the first image exposure.

* * * * *

UNITED STATES PATENT AND TRADEMARK OFFICE
CERTIFICATE OF CORRECTION

PATENT NO. : 4,866,639

DATED : September 12, 1989

INVENTOR(S) : Ronald J. Adrian

It is certified that error appears in the above-identified patent and that said Letters Patent is hereby corrected as shown below:

Column 3, line 51, change "public" to read --double--.

Signed and Sealed this

Thirteenth Day of November, 1990

Attest:

HARRY F. MANBECK, JR.

*Attesting Officer*  *Commissioner of Patents and Trademarks*